United States Patent [19]
Bernd et al.

[11] Patent Number: 6,128,205
[45] Date of Patent: Oct. 3, 2000

[54] POWER FACTOR CORRECTION WITH REDUCED TOTAL HARMONIC DISTORTION

[75] Inventors: Clauberg Y. Bernd, Schaumburg; Rick Liang, Chicago, both of Ill.

[73] Assignee: Philips Electronics North America Corporation, New York, N.Y.

[21] Appl. No.: 09/306,913

[22] Filed: May 7, 1999

[51] Int. Cl.$^7$ ...................................................... H02M 7/68
[52] U.S. Cl. .............................. 363/89; 363/44; 323/283; 323/284
[58] Field of Search .................................... 323/207, 222, 323/282, 283, 284; 363/89, 44

[56] References Cited

U.S. PATENT DOCUMENTS

| | | | |
|---|---|---|---|
| 4,683,529 | 7/1987 | Bucher, II | 363/44 |
| 5,801,935 | 9/1998 | Sugden et al. | 363/89 |
| 5,910,891 | 6/1999 | Jo | 363/89 |

*Primary Examiner*—Shawn Riley
*Attorney, Agent, or Firm*—Bernard Franzblau

[57] ABSTRACT

Commercially available transition mode ("TM") power factor correction ("PFC") pre-regulator integrated circuits ("IC") typically have an output pin that is used to control a MOSFET in the power output circuit as well as a multiplier input pin that is used to set the peak current that is conducted by the MOSFET on a cycle-by-cycle basis. A portion of the rectified line voltage typically is applied to the multiplier input pin. Zero crossing distortion in the input line current is significantly decreased by reducing the range of the portion of rectified line voltage applied to the multiplier input of the TM PFC IC. The range may be reduced in any convenient manner. For example, one technique adds a clamping device such as a Zener diode to the voltage divider used to sense the rectified line voltage, so that the peak value at the PFC IC multiplier input is clamped if the rectified line voltage exceeds a certain value. Another technique actively changes the value of impedance in the voltage divider used to sense the rectified line voltage based on, for example, either the peak or average rectified line voltage. The change in the divider impedance may be achieved in any convenient manner, as for example by using a small signal transistor to switch a resistor in and out of the divider and a peak detector or average sense circuit to turn the signal transistor ON or OFF as a function of the rectified line voltage.

24 Claims, 6 Drawing Sheets

POWER FACTOR CORRECTION WITH REDUCED TOTAL HARMONIC DISTORTION

BACKGROUND OF THE INVENTION

The present invention relates to power factor correction in voltage applications, and more particularly to control circuits and methods to adapt power factor correction integrated circuits to wide range applications.

Power factor correction ("PFC") pre-regulators are used in various voltage/power applications so that a quasi-sinusoidal current is drawn in-phase with the line voltage, thereby achieving a power factor ("PF") of very close to one. PF is the ratio of the real power transferred to the output and the apparent power (RMS line voltage times RMS line current) drawn from the power main, so that PF of one is desirable. A common technique for achieving power factor correction in low power applications such as lamp ballasts and low-end monitors is the transition mode ("TM") technique, which is used in many different PFC integrated circuit products available from various manufacturers, such as product number L6561 available from SGS Thomson Microelectronics of Carrollton, Tex., and product number MC34262 available from Motorola, Inc., Semiconductor Products Sector of Austin, Tex.

Figure 1:
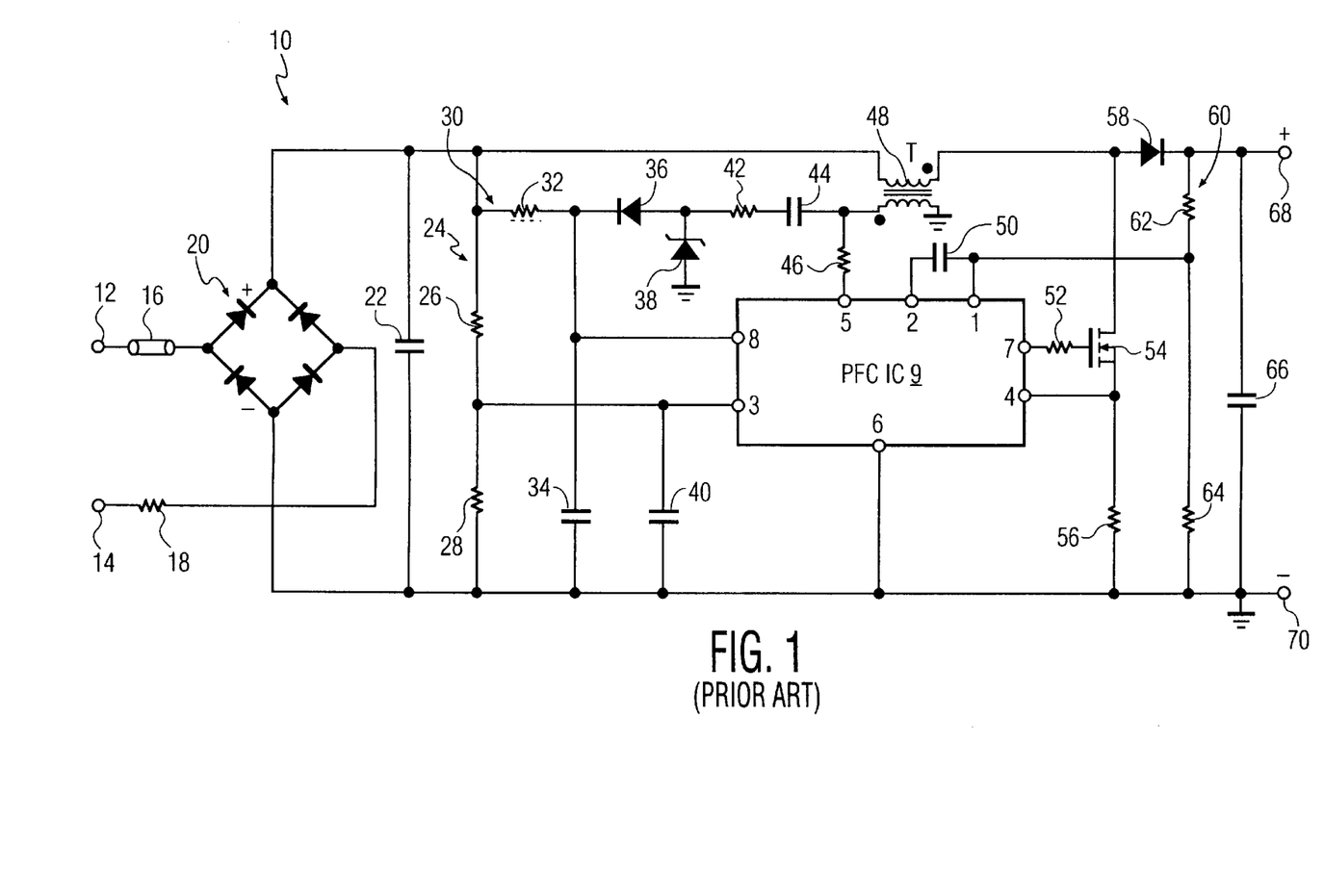
FIG. 1 is a schematic circuit diagram of a prior art application circuit using a power factor correction integrated circuit.

FIG. 1 shows a wide range demonstration board electrical circuit 10. Circuit 10 includes a bridge circuit 20 that delivers a rectified voltage to a boost converter having as its essential elements a boost inductor 48 (in this case, the primary of a transformer), a catch diode 58, an output capacitor 66, and control circuitry that includes a TM PFC integrated circuit ("IC") 9, specifically product number L6561 available from SGS Thomson Microelectronics. The boost converter shown in FIG. 1, which is useful for understanding the operation of the PFC IC 9, uses a switching technique to boost the rectified input voltage from the bridge circuit 20 to a regulated DC output voltage for delivery to a load (not shown) via terminals 68 and 70. The purpose of the PFC IC 9 is to shape its input current in a sinusoidal fashion to be in-phase with the input sinusoidal voltage so as to regulate the DC output voltage.

The circuit 10 operates as follows. An input sinusoidal voltage at terminals 12 and 14 is applied across bridge circuit 20 through fuse 16 and negative temperature coefficient (NTC) device 18. The instantaneous rectified line voltage from the bridge 20 is filtered by input high frequency filter capacitor 22 and applied across a voltage divider 30 having resistor 32, diode 36, resistor 42, capacitor 44, and an auxiliary winding of the boost inductor 48 connected in series. The voltage in the divider 30 between the resistor 32 and diode 36 is applied to $V_{CC}$ pin 8, and the $V_{CC}$ input is used internally in the PFC IC 9 to generate an internal reference voltage. Capacitor 34 is connected to $V_{CC}$ pin 8 for filtering.

In the boost converter, a MOSFET 54 along with a resistor 56 forms a controlled power switch path connected between the boost inductor 48 and ground for energizing and de-energizing the boost induct or 48. The gate of the MOSFET 54 is controlled by the GD output pin 7 of the PFC IC 9 as a function of various voltages applied as inputs to the PFC IC 9. These inputs are ZCD pin 5, COMP pin 2, INV pin 1, and MULT pin 3.

ZCD pin 5 is connected through resistor 46 to the divider 30 at the auxiliary winding of the boost inductor 48 for the purpose of zero current detection and external MOSFET triggering and disabling. Internally, the PFC IC 9 generates a start up signal on output GD pin 7 which turns ON MOSFET 54. Thereafter, the PFC IC 9 internally generates a signal on output GD pin 7 to turn ON the MOSFET 54 as the voltage across the boost inductor 48 reverses. This feature allows transition mode operation.

COMP pin 2 and INV pin 1 are connected to a point between resistors 62 and 64, which form a voltage divider 60 across the output of the circuit 10. The PFC IC 9 compares a portion of the boosted output DC voltage at the terminals 68 and 70 with its internal reference voltage to maintain the pre-regulator output DC voltage constant. A feedback capacitor 50 is connected between pins 1 and 2 for frequency compensation. The PFC IC 9 uses a two-level overvoltage protection scheme, initially decreasing the gate voltage of MOSFET 54 at GD pin 7 to provide a "soft braking" action when a rising output voltage is detected, and then turning OFF the MOSFET 54 to provide a "heavy braking" action if a continuing rise in the output voltage is detected. The voltage across the resistor 56 is applied to the CS input pin 4 of the PFC IC 9 to determine the exact time when the MOSFET 54 is to be turned OFF.

MULT pin 3 is connected to a point between resistors 26 and 28 in a voltage divider 24 to receive a portion of the instantaneous rectified line voltage. The PFC IC 9 uses the MULT input to set the peak current of the MOSFET 54 cycle by cycle. Typically, the MULT input signal is shaped like a rectified sinusoid. Capacitor 40 is connected to MULT pin 3 for filtering.

The various circuits and operation of the integrated circuit 9 are further described by Claudio Adragna in Application Note AN966: L6561 Enhanced Transition Mode Power Factor Corrector, SGS-Thompson Microelectronics, March 1998.

Transition mode PFC ICs from various manufacturers are attractive to product designers since they are placed in relatively simple circuits that require relatively few external components and a relatively low value of boost inductance. Applications that use PFC ICs in an upconverter design generally use a sense resistor divider off the rectified line, such as for example, circuit 10 of FIG. 1, which uses the divider 24 to provide the MULT input voltage at pin 3. Although this signal is a rectified sine wave, distortion occurs at the zero crossing of the input line current. This zero crossing distortion is negligible for low power, small input voltage range applications, but becomes quite large if the load power range is large and/or the input voltage range is large. Such wide range applications can cause input line current total harmonic distortion in excess of 10%, which is generally undesirable.

SUMMARY OF THE INVENTION

A need, therefore, exists for apparatus and methods to permit TM PFC ICs to be used in wide range applications without causing excessively high input line current THD.

Accordingly, an object of the present invention as realized in particular embodiments is to modify the multiplier input signal to a TM PFC circuit so as to reduce input current THD when the load power range is large and/or the input voltage range is large.

Another object of the present invention as realized in particular embodiments is to apply a limited rectified input voltage to the multiplier input of a TM PFC IC so as to reduce input current THD when the load power range is large and/or the input voltage range is large.

Yet another object of the present invention as realized in particular embodiments is to apply a clamped rectified input voltage to the multiplier input of a TM PFC IC so as to reduce input current THD when the load power range is large and/or the input voltage range is large.

A further object of the present invention as realized in particular embodiments is to actively change the value of a rectified input voltage divider resistor to decrease the voltage applied to the multiplier input of a TM PFC IC so as to reduce input current THD when the load power range is large and/or the input voltage range is large.

These and other objects are achieved in the various embodiments of the present invention. For example, one embodiment of the present invention is a power factor correction application comprising a transition mode power factor correction circuit having a multiplier input, an input voltage bus, a voltage divider coupled to the input voltage bus and having a first intermediate node coupled to the multiplier input of the power factor correction circuit, and a voltage range reducing circuit coupled to a second intermediate node of the voltage divider.

Another embodiment of the present invention is a wide range boost converter comprising a pair of line voltage input terminals and a rectifier circuit coupled to the line voltage input terminals. A $V_{CC}$ bus is coupled to the rectifier circuit and a ground bus is coupled to the rectifier circuit. An input filter capacitor is coupled between the $V_{CC}$ bus and the ground bus and a first voltage divider is coupled between the $V_{CC}$ bus and the ground bus and comprises a first resistance, a second resistance, and a third resistance coupled in series. A first Zener diode having an n-terminal is coupled to the first voltage divider between the second and third resistances, and its p-terminal is coupled to the ground bus. A boost inductor comprising a primary winding and an auxiliary winding with the primary winding having a first terminal coupled to the $V_{CC}$ bus. A second voltage divider is coupled between the $V_{CC}$ bus and the ground bus with the second voltage divider comprising a fourth resistance, a first diode, a fifth resistance, a first capacitance, and the auxiliary winding of the boost inductor coupled in series, and further comprising a second Zener diode having an n-terminal coupled between the first diode and the fifth resistance and a p-terminal coupled to the ground bus. A catch diode has a p-terminal coupled to the second terminal of the primary winding of the boost inductor. A controlled power switch path has one terminal coupled between the primary winding of the boost inductor and the catch diode, and another terminal coupled to the ground bus, the controlled power switch path comprising a MOSFET transistor and a sixth resistance coupled in series. A positive regulated voltage output terminal is coupled to an n-terminal of the catch diode and a negative regulated voltage output terminal is coupled to the ground bus. A third voltage divider is coupled between the positive and negative regulated voltage output terminals, the third voltage divider comprising a seventh resistance and an eighth resistance. An output capacitance is coupled between the positive and negative regulated voltage output terminals and a ninth resistor has a first terminal coupled to the second voltage divider between the first capacitance and the auxiliary winding of the boost inductor. A tenth resistor has a first terminal coupled to the MOSFET transistor. A transition mode power factor correction integrated circuit has an INV pin coupled to the third voltage divider between the seventh and eighth resistances, a COMP pin coupled to the INV pin through a second capacitance, a MULT pin coupled to the first voltage divider between the first and second resistances, a CS pin coupled to the controlled power switch path between the MOSFET transistor and the sixth resistance, a ZCD pin coupled to a second terminal of the ninth resistance, a GND pin coupled to the ground bus, a GD pin coupled to a second terminal of the tenth resistance, and a $V_{CC}$ pin coupled to the second voltage divider between the fourth resistance and the first diode.

Yet another embodiment of the present invention is a method of performing a power factor correction in a wide range application that incorporates a transition mode power factor correction integrated circuit having an IC output pin for controlling current flow in a controlled power switch path and an IC input pin for defining peak current flow through the controlled power switch path on a cycle-by-cycle basis. The method comprises rectifying an input line voltage to obtain a rectified line voltage, applying a first portion of the rectified line voltage to the IC input pin while voltage on the IC input pin is below a predetermined value, and applying a second portion of the rectified line voltage to the IC input pin while voltage on the IC input pin is above the predetermined value, the second portion being less than the first portion.

DETAILED DESCRIPTION OF THE INVENTION

Commercially available transition mode ("TM") power factor correction ("PFC") pre-regulator integrated circuits ("IC") typically have an output pin that is used to control a MOSFET in the power output circuit as well as a multiplier input pin that is used to set the peak current that is conducted by the MOSFET on a cycle-by-cycle basis. Zero crossing distortion in the input line current is seen when commercially available TM PFC ICs are used in wide range voltage applications, which include, for example, those having a large load power range and/or a large input voltage range. We have found that this zero crossing distortion is significantly decreased by reducing the range of the portion of rectified line voltage applied to the multiplier input of the TM PFC IC. The range may be reduced in any convenient manner. For example, one technique adds a clamping device to the voltage divider used to sense the rectified line voltage, so that the peak value at the PFC IC multiplier input is clamped if the rectified line voltage exceeds a certain value. A Zener diode is a suitable clamping device; other suitable clamping devices include varistors, avalanche diodes, MOSFETs, active clamping circuits, and diodes to fixed voltages, for example. Another technique actively changes the value of impedance in the voltage divider used to sense the rectified line voltage based on, for example, either the peak or average rectified line voltage. The change in the divider impedance may be achieved in any convenient manner, as for example by using a small signal transistor to switch a resistor in and out of the divider and a peak detector or average sense circuit to turn the signal transistor ON or OFF as a function of the rectified line voltage.

Figure 2:
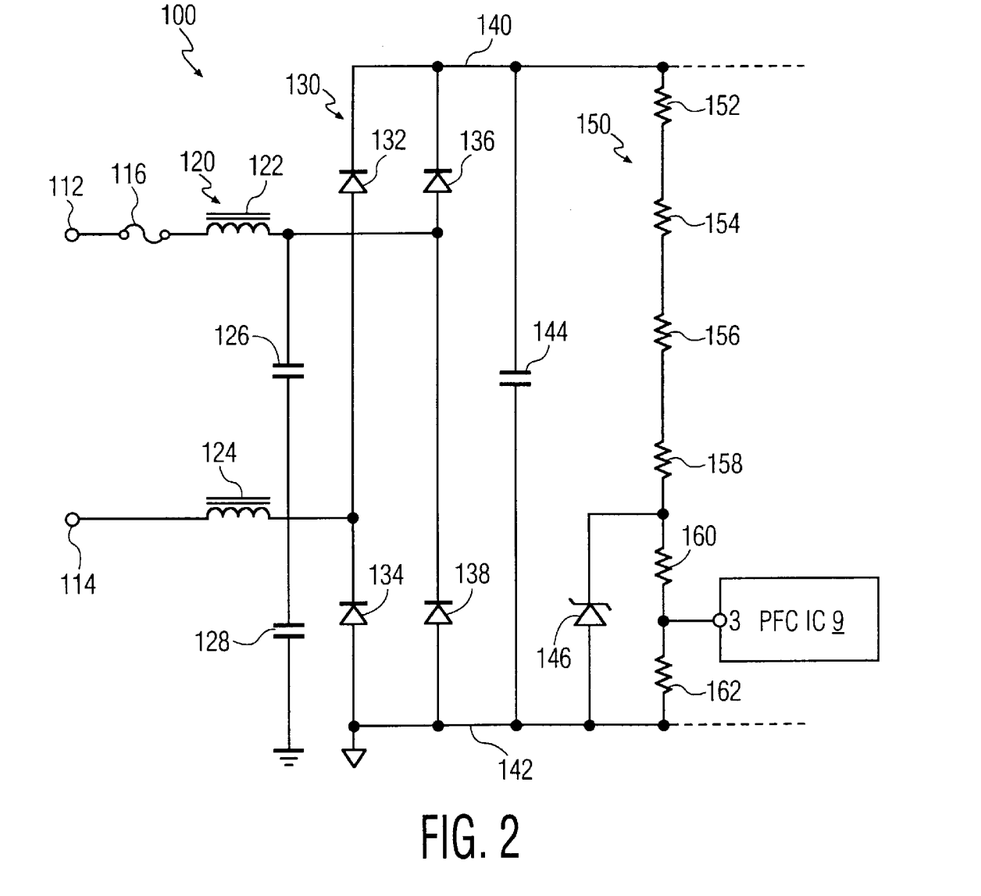
FIG. 2 is a schematic circuit diagram of a circuit in accordance with the present invention for clamping input voltage to a multiplier input pin of a power factor correction integrated circuit.

An illustrative circuit 100 that employs a clamping device to clamp the peak value at the PFC IC multiplier input is shown in FIG. 2. An input sinusoidal voltage is applied to terminals 112 and 114, filtered by an electromagnetic interference ("EMI") filter 120, and applied across bridge circuit 130. Illustratively, the EMI filter 120 is a well-known circuit arrangement of inductors 122 and 124 and capacitors 126 and 128, although other well-known EMI filters are also suitable. Illustratively, the bridge circuit 130 includes diodes 132, 134, 136 and 138 in a well known circuit arrangement, although other well known rectifier circuits and devices are also suitable. The rectified voltage output from the bridge circuit 130 is carried on a $V_{CC}$ bus 140 and a ground bus 142 and is applied across an input high frequency filter capacitor 144 and also across a voltage divider 150 having resistors 152, 154, 156, 158, 160 and 162 connected in series. The input to the MULT pin 3 of the PFC IC 9, illustratively product number L6561 available from SGS Thomson Microelectronics, is taken from a node between resistors 160 and 162. The n-terminal of a Zener diode 146 is connected to a point between resistors 160 and 158 and the p-terminal is connected to the ground bus 142. The other elements of the boost converter such as the voltage divider 30, the boost inductor 48, the MOSFET 54, and the voltage divider 60 are connected to the $V_{CC}$ bus 140 and the ground bus 142 as shown in FIG. 1, and the other connections to the PFC IC 9 are as shown in FIG. 1.

The operation of the circuit 100 is apparent from the waveforms shown in FIGS. 4, 6, 8 and 10, which were obtained with the circuit 100, when compared to the waveforms shown in FIGS. 3, 5, 7 and 9, which were obtained with the circuit 100 from which the Zener diode 146 was omitted. FIGS. 3 through 10 were obtained with the various elements of the circuit 100 (FIG. 2) and circuit 10 (FIG. 1, excluding elements for which circuit 100 substitutes) having the values or equivalent values (where a component type is identified) as set forth in Tables 1 and 2 respectively. In addition, transformer 48 (Table 2) has a core such as Thomson-CSF type B1ET2910A (ETD 29×16×10 mm) or equivalent, a primary 90T of Litz wire 10×0.2 mm, a secondary 11T of #27 AWG (0.15 mm), and a gap of 1.8 mm for a total primary inductance of 0.7 mH.

TABLE 1

| Inductor 122 | Common mode 10 mH | Diode 138 | BYD 17J |
| Inductor 124 | Common mode 10 mH | Diode 146 | 13 volt |
| Capacitor 126 | 100 nF | Resistor 152 | 174 KΩ |
| Capacitor 128 | 2.2nF | Resistor 154 | 174 KΩ |
| Capacitor 144 | 56 nF | Resistor 156 | 174 KΩ |
| Diode 132 | BYD 17J | Resistor 158 | 174 KΩ |
| Diode 134 | BYD 17J | Resistor 160 | 4.7 KΩ |
| Diode 136 | BYD 17J | Resistor 162 | 4.7 KΩ |

TABLE 2

| Transformer 48 | See Text | Resistor 32 | 240 KΩ |
| Capacitor 34 | 22 µF 25 Volt | Resistor 42 | 100 Ω |
| Capacitor 44 | 10 nF | Resistor 46 | 68 KΩ |
| Capacitor 50 | 680 nF | Resistor 52 | 10 Ω |
| Capacitor 66 | 100 µF | Resistor 56 | 0.556 Ω 1 Watt |
| Diode 36 | 1N4150 | Resistor 62 | 950 KΩ |
| Diode 38 | 1N5248B | Resistor 64 | 10 KΩ 1% |
| Diode 58 | BYT03-400 | MOSFET 54 | STP7NA40 |

It will be appreciated that these values are merely illustrative, and that the values of these various elements are selected based on such factors as line voltage, power dissipation, cost, availability, and circuit designer preference. Detailed information about type L6561 PFC IC, which is suitable for use with circuit 100, and considerations for selecting component values for and applications for the circuit 10 are described by Claudio Adragna in Application Note AN966: L6561 Enhanced Transition Mode Power Factor Corrector, SGS-Thompson Microelectronics, March 1998, which hereby is incorporated herein by reference in its entirety. With respect to circuit 100, resistors 152, 154, 156 and 158 may be realized in a single resistor, but the use of separate smaller resistors is desirable where, for example, surface mounted components are used because of power dissipation and voltage rating considerations. The Zener diode 146 is shown with its n-terminal connected to a point between the resistors 158 and 160, but the actual point of connection in the voltage divider 150 depends on the desired clamping effect and the characteristics of the Zener diode selected for use. A Zener diode having a higher reverse breakdown or placed in series with ordinary diodes would be connected to a point between, for example, resistors 154 and 156, while a Zener diode having a lower reverse breakdown and a higher rated power dissipation would be connected to a point between resistors 160 and 162. In general, suitable component values include those selected to result in waveforms generally like those of FIGS. 4, 6, 8 and 10.

Figure 3:
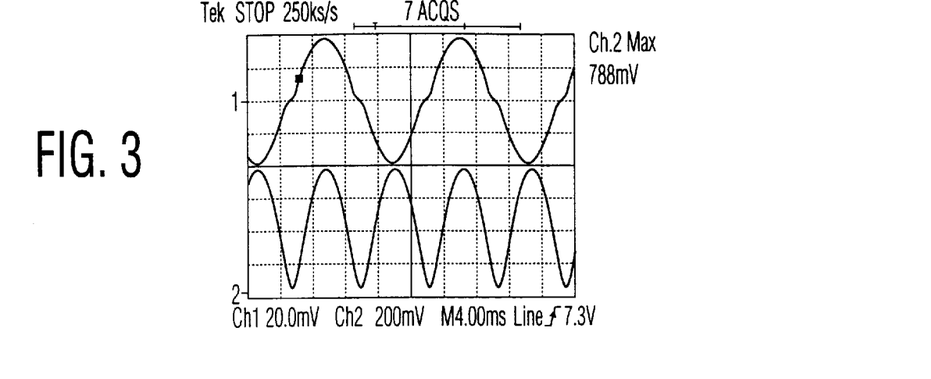
FIG. 3 is a waveform diagram showing an input line current and a portion of the rectified input line voltage that is applied to a multiplier input pin of a power factor correction integrated circuit, for the circuit of FIG. 2 having a 26 watt lamp load at 120 volts and from which the Zener diode is omitted.
Figure 4:
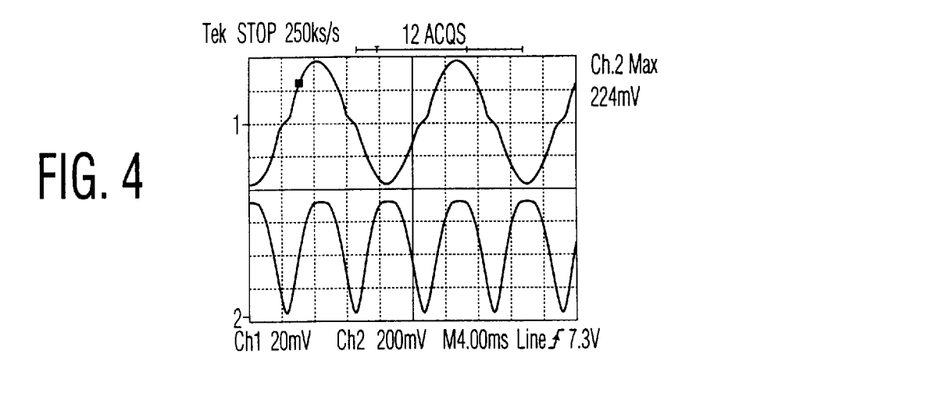
FIG. 4 is a waveform diagram showing an input line current and a portion of the rectified input line voltage that is applied to a multiplier input pin of power factor correction integrated circuit, for the circuit of FIG. 2 having a 26 watt lamp load at 120 volts and which includes the Zener diode as shown therein, for comparison with FIG. 3.

FIGS. 3 and 4 are waveform traces comparing the input line current THD (upper waveforms) and the MULT input signal (lower waveforms) for, respectively, the circuit of FIG. 2 with the Zener diode 146 omitted and with Zener diode 146 included, for a 26 watt lamp load at 120 volts. As can be seen in FIG. 3, the MULT input signal (the lower waveform) is shaped like a rectified sinusoid, which is typical for circuits that use TM PFC ICs. Distortion can be seen on the input line current, but the THD is below 10%. Specifically, in FIG. 3 the power is 30.0 watts, the power factor ("PF") is 0.996, and THD is 8.7%. At this low power level, the advantages of the circuit 10 with the Zener diode 146 are evident but are not significant. Specifically, in FIG. 4 the power is 30.1 watts, the power factor ("PF") is 0.997, and THD is 7.6%.

Figure 5:
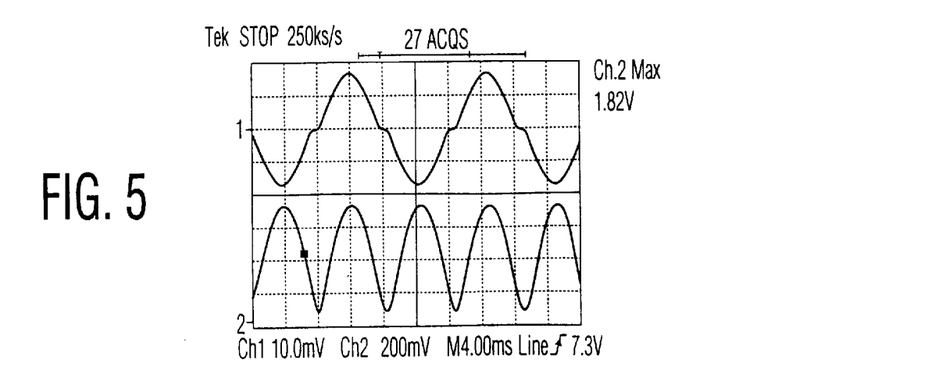
FIG. 5 is a waveform diagram showing an input line current and a portion of the rectified input line voltage that is applied to a multiplier input pin of power factor correction integrated circuit, for the circuit of FIG. 2 having a 26 watt lamp load at 277 volts and from which the Zener diode is omitted.
Figure 6:
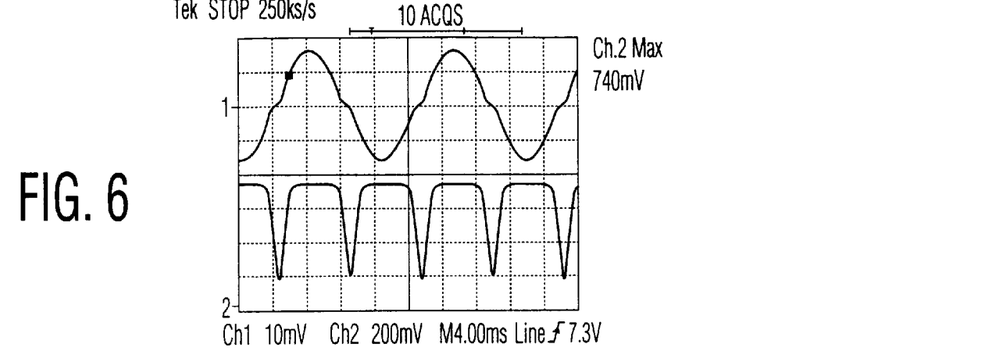
FIG. 6 is a waveform diagram showing an input line current and a portion of the rectified input line voltage that is applied to a multiplier input pin of power factor correction integrated circuit, for the circuit of FIG. 2 having a 26 watt lamp load at 277 volts and which includes the Zener diode as shown therein, for comparison with FIG. 5.

FIGS. 5 and 6 are waveform traces comparing the input line current THD (upper waveforms) and the MULT input signal (lower waveforms) for, respectively, the circuit of FIG. 2 with the Zener diode 146 omitted and with Zener diode 146 included, for a 26 watt lamp load at 277 volts. As can be seen in FIG. 5, the input line current is heavily distorted. Specifically, in FIG. 5 the power is 29.9 watts, PF is 0.987, and THD is an unacceptable 14.7%. However, as can be seen by comparing FIG. 6 with FIG. 5, the input line current in the circuit with the Zener diode is not as heavily distorted. Specifically, in FIG. 6 the power is 30.1 watts, PF is 0.995, and THD is only 6.8%. Observe that the MULT input signal (the lower waveform) of FIG. 6 is not shaped like the rectified sinusoid typically found in circuits that use TM PFC ICs and which is seen in FIG. 5. In other words, the circuit 100 generates a unique reference signal for the multiplier input of the TM PFC IC 9 that results in superior performance of the application circuit at large load power range and/or a large input voltage range.

Figure 7:
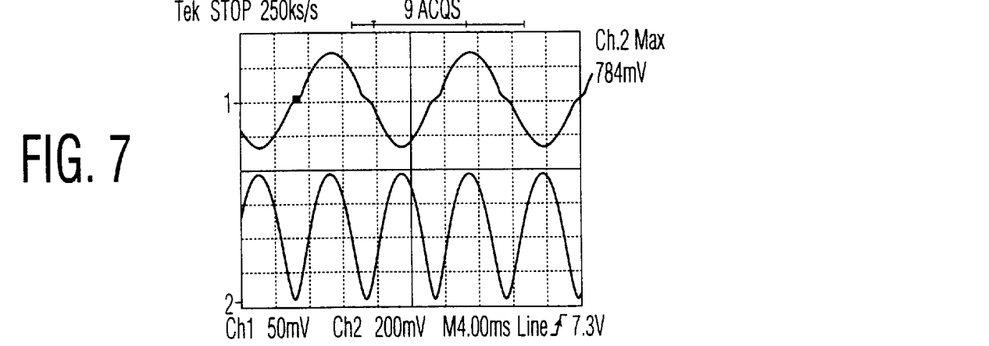
FIG. 7 is a waveform diagram showing an input line current and a portion of the rectified input line voltage that is applied to a multiplier input pin of power factor correction integrated circuit, for the circuit of FIG. 2 having a two 26 watt lamp load at 120 volts and from which the Zener diode is omitted.
Figure 8:
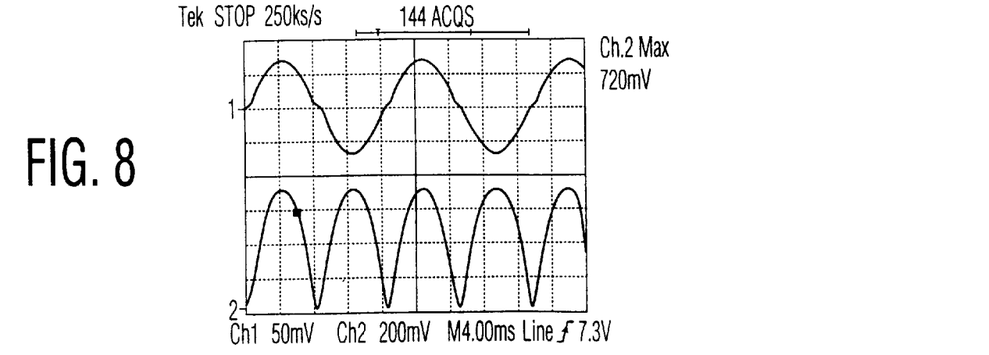
FIG. 8 is a waveform diagram showing an input line current and a portion of the rectified input line voltage that is applied to a multiplier input pin of power factor correction integrated circuit, for the circuit of FIG. 2 having a two 26 watt lamp load at 120 volts and which includes the Zener diode as shown therein, for comparison with FIG. 7.

FIGS. 7 and 8 are waveform traces comparing the input line current THD (upper waveforms) and the MULT input signal (lower waveforms) for, respectively, the circuit of FIG. 2 with the Zener diode 146 omitted and with Zener diode 146 included, for a two 26 watt lamp load at 120 volts. At this low input voltage range, the advantages of the circuit 10 with the Zener diode 146 are evident but are not significant. Specifically, in FIG. 7 the power is 56.1 watts, PF is 0.997, and THD is 5.8%, while in FIG. 8 the power is 57.3 watts, PF is 0.998, and THD is 4.5%.

Figure 9:
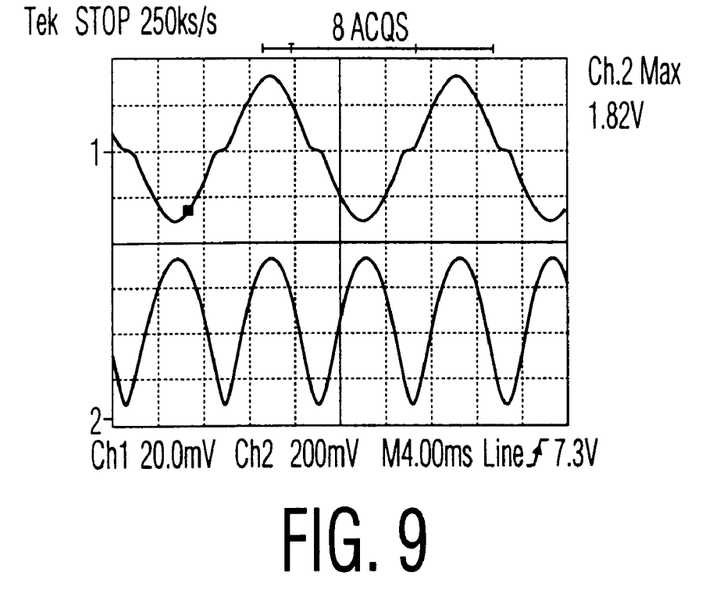
FIG. 9 is a waveform diagram showing an input line current and a portion of the rectified input line voltage that is applied to a multiplier input pin of power factor correction integrated circuit, for the circuit of FIG. 2 having a two 26 watt lamp load at 277 volts and from which the Zener diode is omitted.
Figure 10:
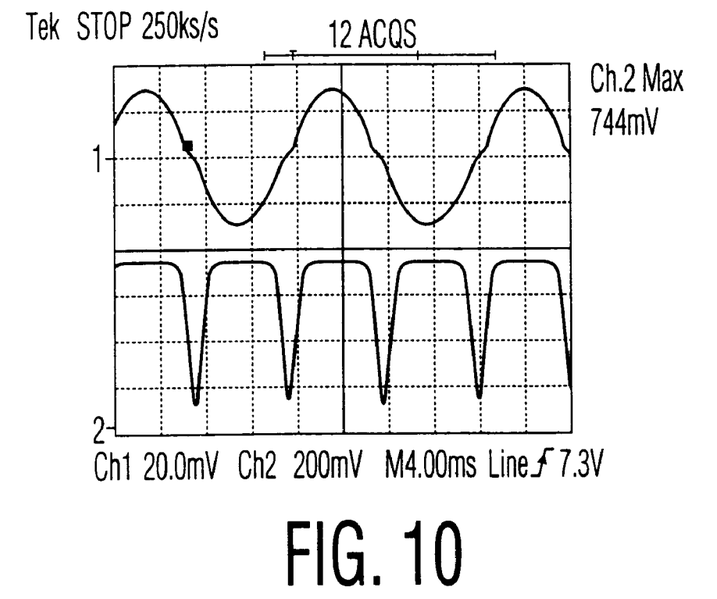
FIG. 10 is a waveform diagram showing an input line current and a portion of the rectified input line voltage that is applied to a multiplier input pin of power factor correction integrated circuit, for the circuit of FIG. 2 having a two 26 watt lamp load at 277 volts and which includes the Zener diode as shown therein, for comparison with FIG. 9.

FIGS. 9 and 10 are waveform traces comparing the input line current THD (upper waveforms) and the MULT input signal (lower waveforms) for, respectively, the circuit of FIG. 2 with the Zener diode 146 omitted and with Zener diode 146 included, for a two 26 watt lamp load at 277 volts. As can be seen in FIG. 9, the input line current is heavily distorted. Specifically, in FIG. 9 the power is 56.1 watts, PF is 0.992, and THD is an unacceptable 12.5%. However, as can be seen by comparing FIG. 10 with FIG. 9, the input line current in the circuit with the Zener diode is not as heavily distorted. Specifically, in FIG. 10 the power is 58 watts, PF is 0.998, and THD is only 4.5%. The resulting performance improvement with the use of circuit 100 is quite noticeable.

Figure 11:
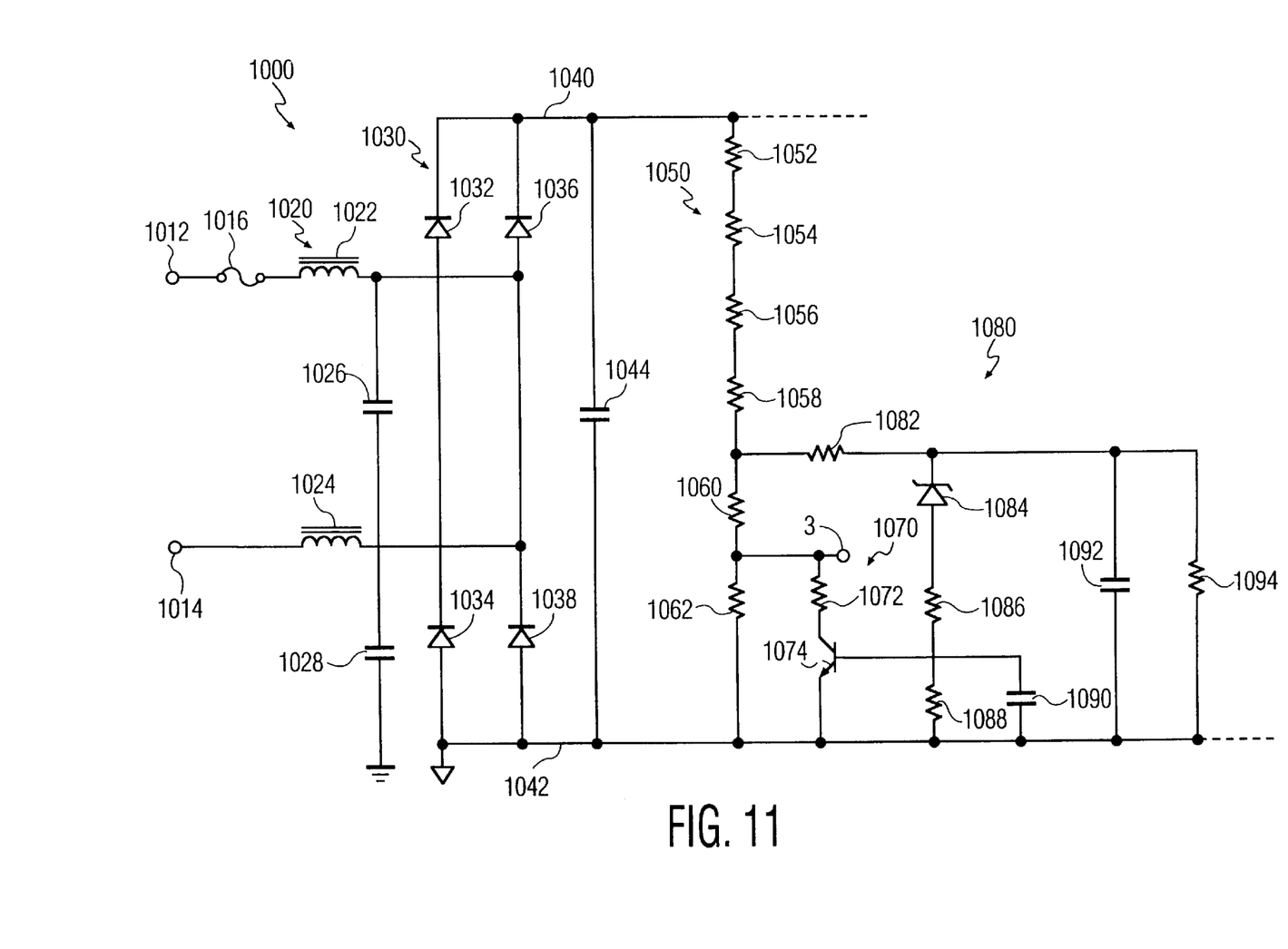
FIG. 11 is a schematic circuit diagram of a circuit in accordance with the present invention for changing the value of a resistance used to generate an input voltage to a multiplier input pin of a power factor correction integrated circuit.

FIG. 11 is a schematic circuit diagram of a circuit in accordance with the present invention for changing the value of a resistance used to generate an input voltage to the multiplier input pin of a power factor correction integrated circuit. The EMI circuit 1020, the bridge circuit 1030, the input capacitor 1044, and the divider 1050 function in the same manner as, respectively, the EMI circuit 120, the bridge circuit 130, the input capacitor 144, and the divider 150 of FIG. 2. An average rectified line voltage detector 1080 operates by charging capacitor 1092 through resistor 1082 from the divider 1050 (illustratively from a point between resistors 1058 and 1060) when the rectified line voltage is high, and discharging the capacitor 1092 through resistor 1094 when the rectified line voltage is low. When the stored (averaged) voltage across the capacitor 1092 exceeds a threshold value established by Zener diode 1084 and resistors 1086 and 1088 (capacitor 1090 is a filtering capacitor), a voltage sufficient to turn ON transistor 1074 in the switched resistivity path 1070 is applied to its base to place resistor 1072 in parallel with the resistor 1062, thereby actively lowering the resistance between the multiplier pin 3 to ground and reducing the multiplier input voltage applied to the multiplier pin 3. It will be appreciated that the use of the particular average voltage detector 1080 is illustrative, and that other average voltage detectors as well as other type of detectors such as peak voltage detectors may be used. Moreover, the particular switched resistivity path 1070 is illustrative, and other types of components may be used to create a switched resistivity path and other techniques may be used to actively change any impedance in the rectified line voltage divider 1050 to in effect limit the multiplier input voltage range. Selection of particular component values depends on a number of factors such as the input line voltage, power dissipation, and component availability and cost, in a manner well known in the art.

The circuits of FIGS. 2 and 11 are suitable for a great variety of wide range voltage applications, including electronic lamp ballasts, AC-DC adapters, low power SMPS, low end monitors, power supplies, boost topology pre-regulators, PFC flyback topology, PFC buck-boost topology, and so forth.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. A power factor correction apparatus comprising:
    a transition mode power factor correction circuit having a multiplier input;
    an input voltage bus;
    a voltage divider coupled to the input voltage bus, the voltage divider having a first intermediate node coupled to the multiplier input of the power factor correction circuit and a second intermediate node; and
    a voltage range reducing circuit coupled to the second intermediate node of the voltage divider.

2. A power factor correction apparatus as in claim 1 wherein the voltage range reducing circuit comprises a threshold conductance device coupled to the second intermediate node of the voltage divider.

3. A power factor correction apparatus as in claim 2 wherein the threshold conductance device comprises a Zener diode.

4. A power factor correction apparatus as in claim 2 wherein the first and second intermediate nodes of the voltage divider are electrically distinct.

5. A power factor correction apparatus as in claim 2 wherein the first and second intermediate nodes of the voltage divider are electrically identical.

6. A power factor correction apparatus as in claim 1 wherein the voltage range reducing circuit comprises:
   a voltage level detector having an input coupled to the input voltage bus and having an output; and
   a controllable impedance path coupled to a segment of the voltage divider and having an input coupled to the output of the voltage level detector.

7. A power factor correction apparatus as in claim 1 wherein the voltage range reducing circuit comprises:
   a voltage level detector having an input coupled to the second intermediate node of the voltage divider and having an output; and
   a controllable resistivity path coupled to the first intermediate node of the voltage divider and having an input coupled to the output of the voltage level detector.

8. A power factor correction apparatus as in claim 1 further comprising a ground bus, and wherein the voltage divider is coupled between the input voltage bus and the ground bus.

9. A power factor correction apparatus as in claim 8, wherein:
   the voltage divider comprises a first resistance, a second resistance, and a third resistance coupled in series, the first intermediate node being between the first and second resistances and the second intermediate node being between the second and third resistances; and
   the voltage range reducing circuit comprises a Zener diode coupled between the second intermediate node and the ground bus.

10. A power factor correction apparatus as in claim 9 further comprising at least one additional diode coupled between the Zener diode and the ground bus.

11. A power factor correction apparatus as in claim 8, wherein:
   the voltage divider comprises a first resistance and a second resistance, the first and second intermediate nodes being between the first and second resistances; and
   the voltage range reducing circuit comprises a Zener diode coupled between the first intermediate node and the ground bus.

12. A power factor correction apparatus as in claim 8, wherein:
   the voltage divider comprises a first resistance, a second resistance, and a third resistance coupled in series, the first intermediate node being between the first and second resistances and the second intermediate node being between the second and third resistances;
   the voltage range reducing circuit comprises a voltage level detector coupled between the second intermediate node of the voltage divider and the ground bus and having an output; and
   the voltage range reducing circuit further comprises a controllable resistivity path coupled between the first intermediate node of the voltage divider and the ground bus and having an input coupled to the output of the voltage level detector.

13. A power factor correction apparatus as in claim 12 wherein the voltage level detector comprises a voltage peak detector.

14. A power factor correction apparatus as in claim 12 wherein the voltage level detector comprises a voltage averaging detector.

15. A power factor correction apparatus as in claim 12 wherein the controllable resistivity path comprises a resistor in series with a transistor.

16. A wide range boost converter comprising:
   a pair of line voltage input terminals;
   a rectifier circuit coupled to the line voltage input terminals;
   a $V_{CC}$ bus coupled to the rectifier circuit;
   a ground bus coupled to the rectifier circuit;
   an input filter capacitor coupled between the VCC bus and the ground bus;
   a first voltage divider coupled between the $V_{CC}$ bus and the ground bus, the first voltage divider comprising a first resistance, a second resistance, and a third resistance coupled in series;
   a first Zener diode having a first terminal coupled to the first voltage divider between the second and third resistances, and a second terminal coupled to the ground bus;
   a boost inductor comprising a primary winding and an auxiliary winding, the primary winding having a first terminal coupled to the VCC bus and further having a second terminal;
   a second voltage divider coupled between the $V_{CC}$ bus and the ground bus, the second voltage divider comprising a fourth resistance, a first diode, a fifth resistance, a first capacitance, and the auxiliary winding of the boost inductor coupled in series, and further comprising a second Zener diode having a first terminal coupled between the first diode and the fifth resistance and a second terminal coupled to the ground bus;
   a catch diode having a first terminal coupled to the second terminal of the primary winding of the boost inductor and further having a second terminal;
   a controlled power switch path having one terminal coupled between the primary winding of the boost inductor and the catch diode, and another terminal coupled to the ground bus, the controlled power switch path comprising a MOSFET transistor and a sixth resistance coupled in series;
   a first regulated voltage output terminal coupled to the second terminal of the catch diode;
   a second regulated voltage output terminal coupled to the ground bus;
   a third voltage divider coupled between the first and second regulated voltage output terminals, the third voltage divider comprising a seventh resistance and an eighth resistance;
   an output capacitance coupled between the first and second regulated voltage output terminals;
   a ninth resistor having a first terminal coupled to the second voltage divider between the first capacitance and the auxiliary winding of the boost inductor, and further having a second terminal;
   a tenth resistor having a first terminal coupled to the MOSFET transistor, and further having a second terminal; and
   a transition mode power factor correction integrated circuit having an INV pin coupled to the third voltage divider between the seventh and eighth resistances, a COMP pin coupled to the INV pin through a second capacitance; a MULT pin coupled to the first voltage divider between the first and second resistances, a CS pin coupled to the controlled power switch path between the MOSFET transistor and the sixth resistance, a ZCD pin coupled to the second terminal of the ninth resistance, a GND pin coupled to the ground bus, a GD pin coupled to the second terminal of the tenth resistance, and a VCC pin coupled to the second voltage divider between the fourth resistance and the first diode.

17. A method of performing a power factor correction in a wide range application that incorporates a transition mode power factor correction integrated circuit having an IC output pin for controlling current flow in a controlled power switch path and an IC input pin for defining peak current flow through the controlled power switch path on a cycle-by-cycle basis, comprising:

rectifying an input line voltage to obtain a rectified line voltage;

applying a first portion of the rectified line voltage to the IC input pin while voltage on the IC input pin is below a predetermined value; and applying a second portion of the rectified line voltage to the IC input pin while voltage on the IC input pin is above the predetermined value, the second portion being less than the first portion.

18. A method as in claim 17 further comprising detecting whether the rectified line voltage exceeds a predetermined value, and wherein the second portion applying step comprises clamping the voltage on the IC input pin while the voltage on the IC input pin is above the predetermined value.

19. A method as in claim 17 wherein the first portion applying step comprises:

applying the rectified line voltage to a voltage divider; and operating a Zener diode coupled between the voltage divider and ground below a reverse threshold value thereof;

and wherein the second portion applying step comprises applying the rectified line voltage to the voltage divider; and operating the Zener diode coupled between the voltage divider and ground above a reverse threshold value thereof.

20. A method as in claim 17 further comprising detecting whether the rectified line voltage exceeds a predetermined value, and wherein the first portion applying step comprises:

applying the rectified line voltage to a voltage divider; and disconnecting a resistance from the voltage divider when the rectified line voltage is less than the predetermined value;

and wherein the second portion applying step comprises applying the rectified line voltage to the voltage divider; and connecting the resistance in parallel to a segment of the voltage divider when the rectified line voltage is greater than the predetermined value.

21. A power factor correction apparatus as claimed in claim 1 further comprising a control transistor having a control input coupled to a control output of the transition mode power factor correction circuit, wherein a voltage applied to the multiplier input of the transition mode power factor correction circuit controls the switching of the control transistor during the normal steady state operation mode of the power factor correction apparatus.

22. A wide range boost converter comprising:

a pair of input terminals for supplying a rectified sinusoid voltage to the boost converter, a boost inductor comprising a primary winding and a magnetically coupled auxiliary winding, means coupling the primary winding and a first diode in series between a first terminal of the pair of input terminals and a DC output terminal of the boost converter, a control transistor coupled between a second terminal of the pair of input terminals and a circuit point between the boost inductor primary winding and said first diode, a voltage divider coupled between said first and second input terminals and having first and second intermediate nodes, a transition mode power factor correction circuit having a control input coupled to the first intermediate node of the voltage divider and a control output coupled to a control terminal of the control transistor thereby to control the operation of the control transistor during the steady state operation of the boost converter, a series circuit including a second diode, a capacitor and said auxiliary winding coupled between the first and second input terminals and further coupled to a further input of the transition mode power factor correction circuit, and a voltage range reducing circuit coupled to the second intermediate node of the voltage divider.

23. The wide range boost converter as claimed in claim 22 wherein a rectified sinusoidal voltage applied to the control input of the transition mode power factor correction circuit sets the peak current conducted by the control transistor on a cycle-by-cycle basis.

24. The power factor correction apparatus as claimed in claim 1 wherein the voltage divider comprises only passive circuit elements.

* * * * *